G. M. Sternberg, Electro-Magnetic Regulating Valve.

No. 119,541.  
Patented Oct. 3, 1871.

Witnesses:  
C. Raettig  
C. C. Livings

Inventor:  
Geo. M. Sternberg  
by his attorney  
T. D. Stetson 119,541

UNITED STATES PATENT OFFICE.

GEORGE M. STERNBERG, OF NEW YORK, N. Y.

IMPROVEMENT IN ELECTRO-MAGNETIC VALVES.

Specification forming part of Letters Patent No. 119,541, dated October 3, 1871.

*To all whom it may concern:*

Be it known that I, GEORGE M. STERNBERG, of New York city, in the State of New York, have invented certain new and useful Improvements in the Construction and Operation of Valves.

The invention is intended more particularly for controlling the flow of gas for heating purposes under the control of an electro-magnet in which the circuit is closed and broken by the action of a thermometer. Some portions of the apparatus may, however, be used in other situations.

In a patent granted to me dated March 1, 1870, and in some later applications for patents, I have shown means for causing an electro-magnet controlled by a thermometer to affect the motion of the valves where a considerable resistance is experienced. This is done by properly connecting and disconnecting a weight or spring or other source of power. The obvious convenience of causing the electro-magnet to act directly, if possible, has induced me to expend much effort in the endeavor to accomplish this end. The present invention is the result; and with a moderately-strong electro-magnet I am able practically to control the flow of gas so as to regulate the temperature of any moderate quantity of chemicals or other materials with great nicety. I have devised a valve for the purpose which is practically frictionless, and have arranged the parts in connection therewith so as to limit the extent of the opening and the extent of the closing with great nicety. It is of course important to never entirely stop the flow of gas.

The following is a description of what I consider the best means of carrying out the invention. The accompanying drawing forms a part of this specification.

Figure 1:
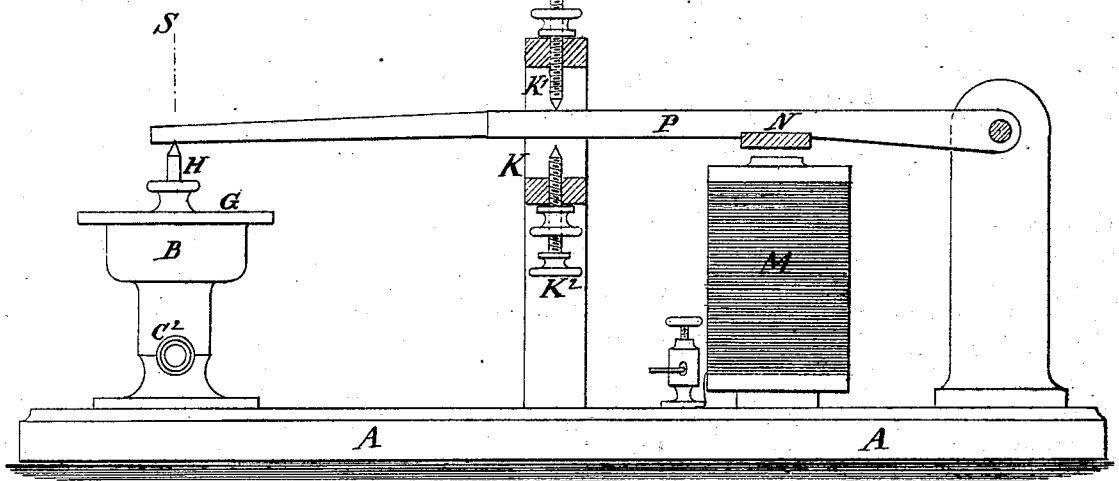
Figure 2:
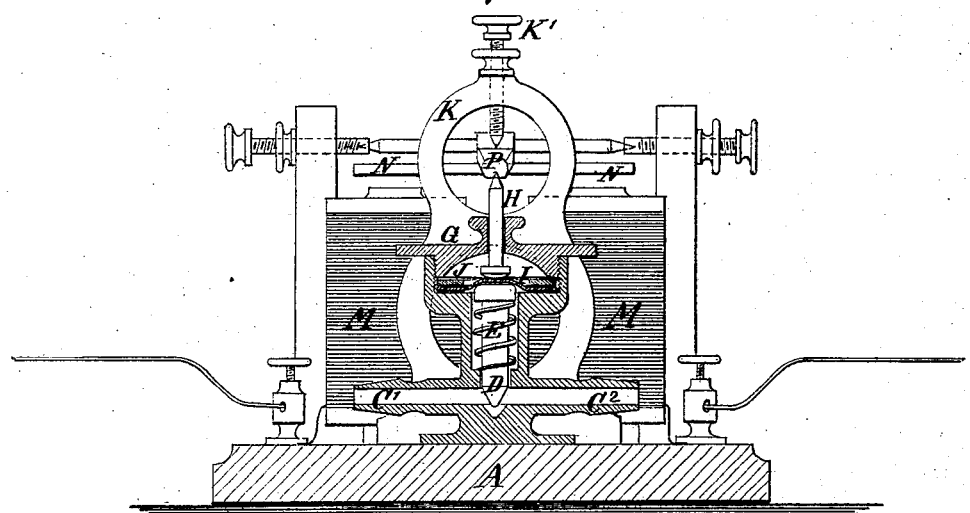

Figure 1 is a longitudinal section through my improved apparatus with the valve in elevation. Fig. 2 is a cross-section on the line $s\ s$ in Fig. 1.

Similar letters of reference indicate like parts in all the figures.

A is a fixed base. B is a casing containing a valve. The valve is represented by D, and fitting in a tapering aperture, as represented, controls the flow of the gas from the pipe or nozzle $C^1$ to the pipe or nozzle $C^2$. The pipe $C^1$ is connected to a street main or other source of gas, not represented, while the pipe $C^2$ leads to and supplies a suitable burner under or in proper connection with the vessel to be heated, in which latter is the thermometer which controls the electro-magnet. The valve D fits loosely in the tapering chamber provided for it, and may be gauged so that it can never sink so low as to be stuck or having its movement sensibly retarded by friction. It is pressed upward with a gentle force by the coiled spring E, for which a space is provided, as represented. The effect of the current, acting through the electro-magnet M, draws down the lever P whenever the proper temperature is exceeded; and the movement of the lever P, acting through suitable connections, presses down the valve D and checks the flow of gas until the temperature has sunk sufficiently to break the circuit and arrest the action of the electro-magnet M. So soon as this occurs the action of the spring E raises the valve D again and increases the flow of gas. The connection of the lever P to the valve D might be direct and simple, except for the necessity of guarding against the leakage of gas. The looseness in the fitting of the valve D within its cavity involves a leakage which it is important to arrest at some other point. I do this by means of a flexible diaphragm. I is a diaphragm, of rubber, having a diameter much larger than the top of the valve D, and mounted with its center resting thereon in a circular chamber provided for the purpose. Its rim is held down by a ring of metal, J, which is held down tightly to its seat by the screw-cap G, so that there can be no leakage of the gas upward past the diaphragm. The lever P presses down on the center of the diaphragm I, through the medium of the loosely-guided pin H, which is supported in the screw-cap G, as represented. The pressure of ordinary street-gas being slight and nearly uniform exerts very little influence on the diaphragm and its connections. Its tendency is to lift the diaphragm and consequently to lift the lever P. It is easy in practice to make the spring E with just sufficient force, so that with the aid of the pressure of the gas it will tend to lift the lever P with a very slight force. Thus mounted, a moderate force in the electro-magnet will depress the valve, and the moment its magnetism is spent the valve will rise. This, with absolute tightness, is the only condition required to attain some degree of perfection in the regulation. I have provided means for adjusting the limit to which the valve may ascend and descend. The lever P passes through a housing, K, in which are mounted two screws, $K^1 K^2$. The upper screw $K^1$ stands with its point a little above the lever P, and the lower $K^2$ with its point a little below the lever. Now, by properly raising and depressing the screw $K^1$ the extent to which the lever P, and consequently the valve D, may rise is adjusted with any degree of delicacy desired, and by raising and depressing the screw $K^2$ the extent to which these parts can sink is correspondingly adjusted. I regulate these parts according to the pressure of the gas, the quantity of the matter to be kept hot, the temperature of the atmosphere, and the exposure of the vessel to currents of air or other causes which shall influence the consumption of heat. The best condition for ordinary cases is attained by setting the upper screw $K^1$ so that the heat, when the lever is up, shall be just a little more than sufficient to keep the mass at the proper temperature. Then set the lower $K^2$ so that the heat, when the lever P is down, shall be but a little below that required to keep the mass at the proper temperature. Under these conditions the valve will vibrate at short intervals between the open and closed positions without admitting any great departure from exactly the temperature required. The screws $K^1 K^2$ should never be set to limit the motion of the lever P so closely as to prevent the apparatus from maintaining the proper heat under any change which is liable to occur in the pressure of the gas or the temperature of the atmosphere. A sudden change in the wind, inducing a rapid lowering of the temperature of the atmosphere during the night, may necessitate the valve to stand always open; but the opening should be made sufficient to allow this condition to properly maintain the temperature, and the same may be said of a rise of the atmospheric temperature in a clear warm day.

The instrument admits of adjustment for all kinds of conditions. By setting the screws $K^1 K^2$ wide apart, so as to allow a wide range in the motion of the valve D, the apparatus will regulate approximately for summer or winter without requiring adjustment; but it is better, under ordinary circumstances, to avoid so great fluctuations in the gas-flame as would be induced by this wide range of motion.

I claim as my improvement in valves and their connections for automatic regulation of temperature—

1. The frictionless valve D, urged in one direction by the spring E or equivalent gentle force, and in the other direction by the lever P or its equivalent, and having a flexible diaphragm, I, mounted so as to prevent the escape of gas, as herein specified.

2. The adjusting means $K^2$, in combination with the valve D and its connections, mounted and operated as and for the purposes herein specified.

3. The adjusting means $K^1$ to limit the opening of the valve, in combination with the adjusting means $K^2$ to limit the closing thereof when the valve is operated through the medium of a diaphragm actuated automatically by a lever, P, or its equivalent, controlled by changes of temperature, as specified.

4. The entire combination and arrangement of parts—to wit: the electro-magnet M, controlled by changes of temperature acting through the medium of the armature N and lever P on the diaphragm I, which latter is free to move in its central portions and tightly confined at its edge, and by its motion controls directly or indirectly the valve D, the whole being adapted to regulate the communication between the gas-pipe $C^1$ and the pipe $C^2$ to maintain a uniform temperature, all substantially as herein specified.

In testimony whereof I have hereunto set my name in presence of two subscribing witnesses.

GEO. M. STERNBERG.

Witnesses:
C. C. LIVINGS,
J. A. SURFLEET. (25)